US012360307B2

(12) United States Patent
Haag et al.

(10) Patent No.: US 12,360,307 B2
(45) Date of Patent: **\*Jul. 15, 2025**

(54) OPTICAL SYSTEM AND OPTICAL COMBINATION

(71) Applicant: 3M INNOVATIVE PROPERTIES COMPANY, St. Paul, MN (US)

(72) Inventors: Adam D. Haag, Woodbury, MN (US); Matthew B. Johnson, Woodbury, MN (US); Ryan T. Fabick, Shoreview, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/777,926

(22) Filed: Jul. 19, 2024

(65) Prior Publication Data

US 2024/0369756 A1     Nov. 7, 2024

Related U.S. Application Data

(63) Continuation of application No. 18/038,285, filed as application No. PCT/IB2021/060141 on Nov. 2, 2021.

(60) Provisional application No. 63/199,041, filed on Dec. 3, 2020.

(51) Int. Cl.
*F21V 8/00* (2006.01)
*G02F 1/13357* (2006.01)

(52) U.S. Cl.
CPC ......... *G02B 6/0056* (2013.01); *G02B 6/0055* (2013.01); *G02F 1/13362* (2013.01)

(58) Field of Classification Search
CPC ............... G02B 6/0056; G02F 1/13362
See application file for complete search history.

(56) References Cited

U.S. PATENT DOCUMENTS

| | | |
|---|---|---|
| 2001/0021445 A1 | 9/2001 | Weber et al. |
| 2002/0015836 A1 | 2/2002 | Jonza et al. |
| 2005/0099678 A1* | 5/2005 | Wang .............. G02B 5/208 359/359 |
| 2005/0200771 A1 | 9/2005 | Lazarev et al. |
| 2006/0109399 A1 | 5/2006 | Kubota et al. |

(Continued)

OTHER PUBLICATIONS

International Search Report for PCT International Application No. PCT/IB2021/060141, mailed on Feb. 14, 2022, 3 pages.

*Primary Examiner* — Keith G. Delahoussaye
(74) *Attorney, Agent, or Firm* — Robert S. Moshrefzadeh

(57) ABSTRACT

An optical system includes an extended illumination source configured to emit light from an extended emission surface thereof toward a display panel. The emitted light includes substantially distinct blue, green and red emission spectra having respective blue, green and red peaks at respective blue, green and red peak wavelengths, and corresponding blue, green and red full widths at half maxima (FWHMs). The blue FWHM extends from a smaller blue wavelength to a longer blue wavelength. The optical system further includes reflective polarizer disposed on the emission surface of the extended illumination source. The reflective polarizer includes a plurality of first polymeric layers. The optical system also includes an optical filter disposed between the reflective polarizer and the emission surface of the extended illumination source.

3 Claims, 10 Drawing Sheets

(56) References Cited

U.S. PATENT DOCUMENTS

| | | |
|---|---|---|
| 2007/0188678 A1 | 8/2007 | Kim et al. |
| 2008/0278066 A1 | 11/2008 | Spindler et al. |
| 2016/0085102 A1 | 3/2016 | Ohmuro et al. |
| 2019/0048255 A1 | 2/2019 | Sakaino |

\* cited by examiner

OPTICAL SYSTEM AND OPTICAL COMBINATION

TECHNICAL FIELD

The present disclosure relates generally to an optical system, and in particular, to an optical system and an optical combination for a backlight.

BACKGROUND

Backlight units are used to provide light to a display panel. Backlight units typically include one or more light sources that emit light. In some cases, backlight units can emit low wavelength blue light and/or ultraviolet (UV) light that may be harmful to viewers.

SUMMARY

In a first aspect, the present disclosure provides an optical system. The optical system includes an extended illumination source configured to emit light from an extended emission surface thereof toward a display panel. The emitted light includes substantially distinct blue, green and red emission spectra having respective blue, green and red peaks at respective blue, green and red peak wavelengths, and corresponding blue, green and red full widths at half maxima (FWHMs). The blue FWHM extends from a smaller blue wavelength to a longer blue wavelength. The optical system further includes a reflective polarizer disposed on the emission surface of the extended illumination source. The reflective polarizer includes a plurality of first polymeric layers numbering at least 10 in total. The optical system further includes an optical filter disposed between the reflective polarizer and the emission surface of the extended illumination source. The optical filter includes a plurality of second polymeric layers numbering at least 10 in total. Each of the first and second polymeric layers has an average thickness of less than about 300 nanometers (nm). For a substantially normally incident light and for each of the blue, green and red peak wavelengths, the plurality of first polymeric layers reflects greater than about 60% of the incident light having a first polarization state, and transmits greater than about 60% of the incident light having an orthogonal second polarization state. For the substantially normally incident light, and for each of the green and red peak wavelengths, and for each of the first and second polarization states, the plurality of second polymeric layers transmits greater than about 70% of the incident light. For the substantially normally incident light, and for the smaller blue wavelength, and for each of the first and second polarization states, the plurality of second polymeric layers transmits less than about 60% of the incident light.

In a second aspect, the present disclosure provides another optical system. The optical system includes an extended illumination source configured to emit light from an extended emission surface thereof toward a display panel. The emitted light includes substantially distinct blue, green and red emission spectra having respective blue, green and red peaks at respective blue, green and red peak wavelengths, and corresponding blue, green and red full widths at half maxima (FWHMs). The blue FWHM extends from a smaller blue wavelength to a longer blue wavelength. The optical system further includes a reflective polarizer disposed on the emission surface of the extended illumination source. The reflective polarizer includes a plurality of first polymeric layers numbering at least 10 in total. The optical system further includes an optical filter disposed between the reflective polarizer and the emission surface of the extended illumination source. The optical filter includes a plurality of second polymeric layers numbering at least 10 in total. Each of the first and second polymeric layers has an average thickness of less than about 300 nm. For a substantially normally incident light and for each of the blue, green and red peak wavelengths, the plurality of first polymeric layers reflects greater than about 60% of the incident light having a first polarization state, and transmits greater than about 60% of the incident light having an orthogonal second polarization state. For the substantially normally incident light, and for each of the green and red peak wavelengths, and for each of the first and second polarization states, the plurality of second polymeric layers transmits greater than about 70% of the incident light. For the substantially normally incident light, and for each of the first and second polarization states, the plurality of second polymeric layers transmits less at the smaller blue wavelength than at the longer blue wavelength by at least 30%.

In a third aspect, the present disclosure provides an optical combination. The optical combination includes a reflective polarizer having a plurality of first polymeric layers numbering at least 10 in total. Each of the first polymeric layers has an average thickness of less than about 300 nm. The optical combination further includes an optical filter disposed in optical communication with the reflective polarizer. The optical filter includes a plurality of second polymeric layers numbering at least 10 in total and disposed between opposing outermost polymeric layers. Each of the opposing outermost polymeric layers and each second polymeric layer therebetween has an average thickness of less than about 300 nm. A thinnest second polymeric layer in the plurality of second polymeric layers is disposed between and spaced apart from the opposing outermost polymeric layers. For a substantially normally incident light, and a blue wavelength range extending from about 430 nm to about 480 nm, a green wavelength range extending from about 500 nm to about 570 nm, and a red wavelength range extending from about 600 nm to about 680 nm, and for at least one wavelength in each of the blue, green and red wavelength ranges, the plurality of first polymeric layers reflects greater than about 60% of the incident light having a first polarization state and transmits greater than about 60% of the incident light having an orthogonal second polarization state. For the substantially normally incident light, and the blue wavelength range extending from about 430 nm to about 480 nm, the green wavelength range extending from about 500 nm to about 570 nm, and the red wavelength range extending from about 600 nm to about 680 nm, and for each of the first and second polarization states, the plurality of second polymeric layers transmits greater than about 70% of the incident light for the at least one wavelength in each of the green and red wavelength ranges. For the substantially normally incident light, and the blue wavelength range extending from about 430 nm to about 480 nm, the green wavelength range extending from about 500 nm to about 570 nm, and the red wavelength range extending from about 600 nm to about 680 nm, and for a ultraviolet (UV) wavelength range extending from about 410 nm to about 420 nm, and for the second polarization state, the pluralities of first and second polymeric layers have respective average transmittances $T1$ and $T2$. $T1/T2 \geq 1.5$.

In a fourth aspect, the present disclosure provides another optical system. The optical system includes an extended illumination source configured to emit light from an extended emission surface thereof toward a display panel.

The emitted light includes a blue emission spectrum having a blue peak at a blue peak wavelength and a corresponding blue full width at half maximum (FWHM) extending from a smaller blue wavelength to a longer blue wavelength. The optical system further includes an optical combination disposed on the emission surface of the extended illumination source. The optical combination includes a reflective polarizer having a plurality of first polymeric layers numbering at least in total. The optical combination further includes an optical filter disposed between the reflective polarizer and the emission surface of the extended illumination source. The optical filter includes a plurality of second polymeric layers numbering at least 10 in total. Each of the first and second polymeric layers has an average thickness of less than about 300 nm. For a substantially normally incident light, and for the blue peak wavelength, the optical combination reflects greater than about 70% of the incident light having a first polarization state and has a transmittance S1 greater than about 30% for an orthogonal second polarization state. For the substantially normally incident light, and for the smaller blue wavelength, the optical combination reflects greater than about 70% of the incident light having the first polarization state and has a transmittance S2 for the second polarization state, S2 less than S1 by at least 10%.

In a fifth aspect, the present disclosure provides another optical system. The optical system includes an extended illumination source configured to emit light from an extended emission surface thereof toward a display panel. The emitted light includes substantially distinct blue, green and red emission spectra having respective blue, green and red peaks at respective blue, green and red peak wavelengths, and corresponding blue, green and red full widths at half maxima (FWHMs). The blue FWHM extends from a smaller blue wavelength to a longer blue wavelength. The optical system further includes an optical filter disposed on the emission surface of the extended illumination source. The optical filter includes a plurality of polymeric layers numbering at least 10 in total. Each of the polymeric layers has an average thickness of less than about 300 nm. For a substantially normally incident light, and for each of the green and red peak wavelengths, and for each of a first and an orthogonal second polarization state, the plurality of polymeric layers transmits greater than about 70% of the incident light. For the substantially normally incident light, and for the smaller blue wavelength, and for each of the first and second polarization states, the plurality of polymeric layers transmits less than about 60% of the incident light.

BRIEF DESCRIPTION OF THE DRAWINGS

Exemplary embodiments disclosed herein may be more completely understood in consideration of the following detailed description in connection with the following figures. The figures are not necessarily drawn to scale. Like numbers used in the figures refer to like components. However, it will be understood that the use of a number to refer to a component in a given figure is not intended to limit the component in another figure labeled with the same number.

DETAILED DESCRIPTION

Figure 1:
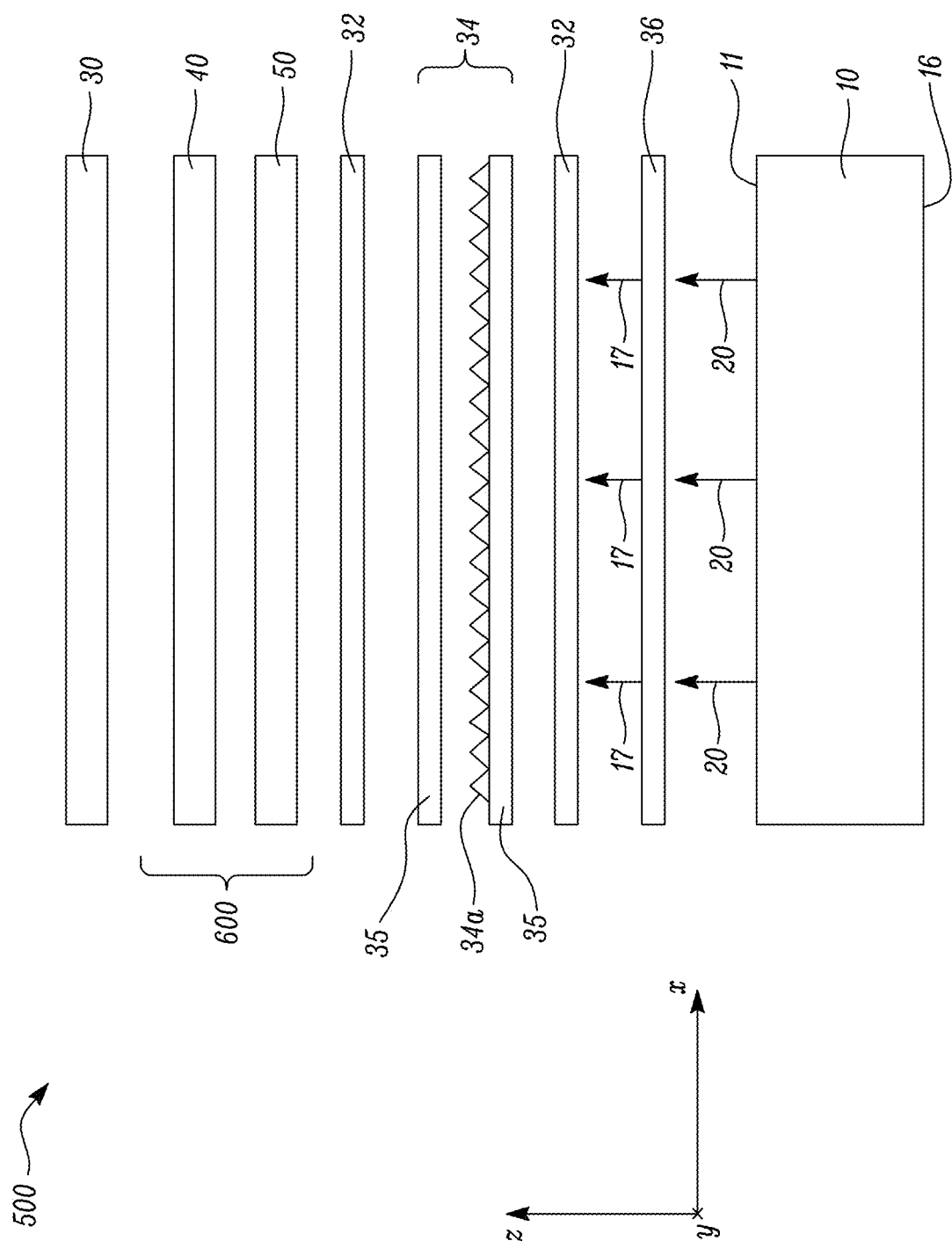
FIG. 1 is a schematic exploded view of an optical system, according to an embodiment of the present disclosure.

In the following description, reference is made to the accompanying figures that form a part thereof and in which various embodiments are shown by way of illustration. It is to be understood that other embodiments are contemplated and may be made without departing from the scope or spirit of the present disclosure. The following detailed description, therefore, is not to be taken in a limiting sense.

The present disclosure relates to an optical system. The optical system may be used in a backlight of electronic devices that include displays, such as computer monitors, televisions, mobile phones, personal digital assistants (PDAs), wearable devices and other portable devices.

Backlights can emit ultraviolet light and low wavelength blue light. Ultraviolet light and low wavelength blue light can be harmful to human eyes and can potentially cause macular degeneration. Conventional electronic displays include light absorbing dyes for blocking certain harmful wavelengths. However, such light absorbing dyes generally have a broad absorbing band. In other words, such light absorbing dyes may absorb light over a relatively long wavelength range and thereby generate an undesirable color shift.

The present disclosure relates to an optical system. The optical system includes an extended illumination source configured to emit light from an extended emission surface thereof toward a display panel. The emitted light includes substantially distinct blue, green and red emission spectra having respective blue, green and red peaks at respective blue, green and red peak wavelengths, and corresponding blue, green and red full widths at half maxima (FWHMs). The blue FWHM extends from a smaller blue wavelength to a longer blue wavelength. The optical system further includes a reflective polarizer disposed on the emission surface of the extended illumination source. The reflective polarizer includes a plurality of first polymeric layers. The optical system further includes an optical filter disposed between the reflective polarizer and the emission surface of the extended illumination source. The optical filter includes a plurality of second polymeric layers. For a substantially normally incident light and for each of the blue, green and red peak wavelengths, the plurality of first polymeric layers reflects greater than about 60% of the incident light having a first polarization state, and transmits greater than about 60% of the incident light having an orthogonal second polarization state. For the substantially normally incident light, for each of the green and red peak wavelengths, and for each of the first and second polarization states, the plurality of second polymeric layers transmits greater than about 70% of the incident light. For the substantially normally incident light, for the smaller blue wavelength, and for each of the first and second polarization states, the plurality of second polymeric layers transmits less than about 60% of the incident light.

The optical filter of the present disclosure may have a relatively low transmittance for the smaller blue wavelength range irrespective of the polarization of incident light. The optical system including the optical filter may therefore have an overall low transmittance for the smaller blue wavelength range for each of the first and second polarization states. This may safeguard a viewer from the harmful effects of low wavelength blue light in a wavelength range from about 400 nanometers (nm) to about 430 nm. Further, the optical filter has a relatively high transmittance for green and red light. In some cases, the optical filter has a high transmittance in the whole visible spectrum except for the low blue wavelength range. Therefore, the optical filter may not provide an undesirable color shift. The optical system including the optical filter may exhibit a high efficiency and a minimal color shift.

In some cases, the optical filter may also have a relatively low transmittance for an ultraviolet (UV) wavelength range extending from about 410 nm to about 420 nm as compared to the reflective polarizer. The optical system including the optical filter may therefore substantially block light in the UV wavelength range and protect the viewer from UV light exposure.

The reflective polarizer and the optical filter of the present disclosure together form an optical combination. For a substantially normally incident light and for the blue peak wavelength, the optical combination reflects greater than about 70% of the incident light having the first polarization state and has a transmittance S1 greater than about 30% for the second polarization state. For the smaller blue wavelength, the optical combination reflects greater than about 70% of the incident light having the first polarization state and has a transmittance S2 for the second polarization state, such that S2 is less than S1 by at least 10%. Thus, the optical combination may provide a transition from substantially reflecting or blocking light (e.g., transmittance <10% at 420 nm) to substantially transmitting light (e.g., transmittance >50% at 440 nm) within a relatively narrow wavelength range of about 15 nm to about 20 nm. For the second polarization state, the optical combination may therefore provide a strong transmission band with a sharp band edge required to obtain a color balanced white transmission, while blocking smaller blue wavelengths. The reflective polarizer and the optical filter may enable the optical system to substantially block low wavelength blue light in a narrow band. Hence, the combination of the reflective polarizer and the optical filter of the present disclosure may exhibit an improved performance in reducing the transmission of smaller blue wavelengths in the visible spectrum, while providing minimal color shift.

Each of the reflective polarizer and the optical filter includes a plurality of first and second polymeric layers, respectively. Such above mentioned desired properties of the optical filter and the reflective polarizer are achieved by various factors such as appropriate material selection of the polymeric layers, thicknesses of the polymeric layers, count of the polymeric layers, etc.

Referring now to FIG. 1, an optical system 500 is illustrated according to an embodiment of the present disclosure. The optical system 500 defines mutually orthogonal x, y, and z-axes. The x and y-axes are in-plane axes of the optical system 500, while the z-axis is a transverse axis disposed along a thickness of the optical system 500. In other words, the x and y-axes are disposed along a plane of the optical system 500, while the z-axis is perpendicular to the plane of the optical system 500.

The optical system 500 includes an extended illumination source 10, a reflective polarizer 40, an optical filter 50, and a display panel 30. The reflective polarizer 40, the optical filter 50, and the display panel 30 are disposed adjacent to each other along the z-axis. In some embodiments, the reflective polarizer 40 and the optical filter 50 are bonded together, for example, by means of an optical adhesive, epoxy, lamination, or any other suitable method of attachment. In the illustrated embodiment, the reflective polarizer 40 is disposed between the optical filter 50 and the display panel 30.

The extended illumination source 10 defines an extended emission surface 11 and a bottom surface 16 opposite to the extended emission surface 11. The extended illumination source 10 is configured to emit light 20 from the extended emission surface 11 thereof toward the display panel 30. In some embodiments, the display panel 30 includes an organic light emitting diode (OLED) display panel. In some other embodiments, the display panel 30 includes a liquid crystal display (LCD) panel.

The light 20 emitting from the display panel 30 is generally unpolarized. However, in some cases, the light 20 may be at least partially polarized light. For the purpose of explanation, the light 20 may be treated as light having an unknown or arbitrary polarization state or distribution of polarization states. Further, the reflective polarizer 40 reflects the light 20 having a first polarization state along the x-axis. The reflective polarizer 40 transmits the light 20 having an orthogonal second polarization state along the y-axis.

The optical system 500 further optionally includes a light converting layer 36 disposed adjacent to the extended emission surface 11 of the extended illumination source 10. The light converting layer 36 converts at least a portion of the light 20 to a light 17. The light 17 may have a wavelength distribution different from a wavelength distribution of the light 20. In some embodiments, for at least a first wavelength, the light converting layer 36 converts at least a portion of the light 20 to the light 17 having at least a second wavelength different from the first wavelength. For example, the light converting layer 36 may convert a blue light to a green light or a red light. In some embodiments, the light converting layer 36 changes or converts the light 20 emitted from the extended illumination source 10 to white light. i.e., the light 17. Further, the light converting layer 36 may emit white light toward the optical filter 50. In some embodiments, the light converting layer 36 includes a semiconductor material, for example, a semiconductor nano crystal. The light converting layer 36 may provide advantages of, but not limited to, substantially improved color reproducibility and color purity. In some embodiments, the semiconductor nano crystal may be formed of at least one of a group II-VI compound semiconductor material, a group III-V compound semiconductor material or a group IV semiconductor material. In some embodiments, the light converting layer 36 may include a plurality of layers.

The optical system 500 further includes at least one diffuser 32 disposed between the light converting layer 36 and the optical filter 50. In the illustrated embodiment of FIG. 1, the optical system 500 includes two diffusers 32. One of the diffusers 32 is disposed adjacent to the light converting layer 36, and the other diffuser 32 is disposed adjacent to the optical filter 50. In some other embodiments, the optical system 500 may include only one diffuser 32. The diffuser 32 diffuses the light 17 emitted from the light converting layer 36. Specifically, the diffuser 32 may spatially spread the light 17 received from the light converting layer 36. The diffuser 32 may include a diffuser film or plate made of any suitable diffusing material or materials. In some embodiments, the diffuser 32 may be disposed directly on the light converting layer 36. The diffuser 32 may diffuse incoming light so that the intensity of the light is more spatially uniform. Light coming from one or more-point sources may be much more intense at particular locations on an incident face of the diffuser 32. Light that exits the diffuser 32, however, may be more uniform in intensity across the exit surface of the diffuser 32.

With continued reference to FIG. 1, the optical system 500 further includes a prism film 34 disposed between the diffusers 32. The prism film 34 includes two crossed prism layers 35 disposed adjacent to each other. Each prism layer 35 includes a plurality of prismatic structures 34a forming inclined ridges. Further, the prismatic structures 34a of the prism layers 35 may be inclined to each other. Specifically, the prismatic structures 34a of the prism layers 35 may be substantially orthogonal to each other. Depending on an incident angle of light received from the diffuser 32, the light may either pass through the prism film 34 or the light may be redirected back to the diffuser 32. The redirected light may be then recycled. The prism film 34 may increase an on-axis brightness of the optical system 500 and may therefore act as a brightness enhancing layer. Examples of the prism film 34 includes Vikuiti™ brand Brightness Enhancing Film (BEF), available from 3M Company. Alternatively, the prism film 34 may include Vikuiti™ brand Transmissive Right Angle Film (TRAF), also available from 3M Company.

In some embodiments, the light converting layer 36, the diffusers 32, the prism film 34, the optical filter 50, the reflective polarizer 40, and the display panel 30 are substantially co-extensive with each other, or of same in-plane dimensions (i.e., length and width). Specifically, the light converting layer 36, the diffusers 32, the prism film 34, the optical filter 50, the reflective polarizer 40, and the display panel 30 may be substantially co-extensive with each other in the x-y plane. Further, the light converting layer 36, the diffusers 32, the prism film 34, the optical filter 50, the reflective polarizer 40, and the display panel 30 are disposed adjacent to each other along the z-axis of the optical system 500. In some embodiments, the optical system 500 may further include an absorbing polarizing film disposed between the extended illumination source 10 and the display panel 30.

In some embodiments, the optical system 500 may include additional or intermediate films, layers, or components, such as, turning layers or substrate layers. The optical system 500 may, in total, be of any suitable thickness based on desired application attributes.

Figure 2A:
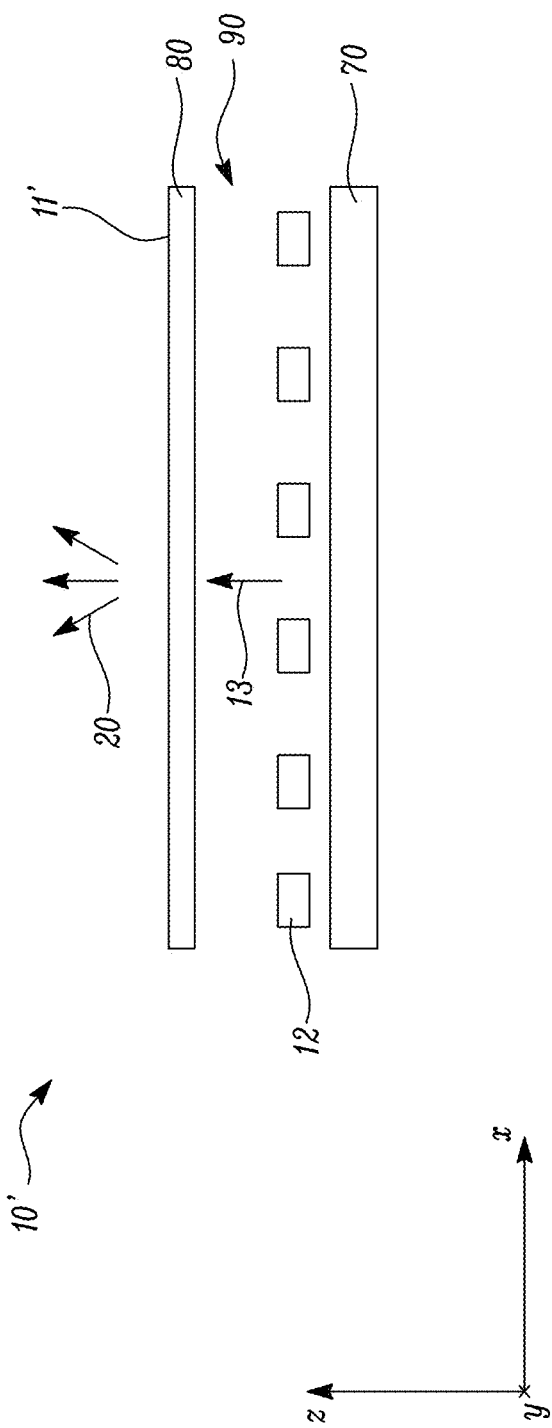
FIG. 2A is a schematic exploded view of an illumination source of the optical system of FIG. 1, according to an embodiment of the present disclosure.

FIG. 2A illustrates an extended illumination source 10' according to an embodiment of the present disclosure. The extended illumination source 10' can used as the extended illumination source 10 shown in FIG. 1. The extended illumination source 10' includes a reflective layer 70, a first optically diffusive layer 80, and at least one light source 12. The first optically diffusive layer 80 is disposed on the reflective layer 70 for scattering light 13, and includes an extended emission surface 11'. The first optically diffusive layer 80 and the reflective layer 70 are substantially coextensive with each other in length and width, and define an optical cavity 90 therebetween. Specifically, the first optically diffusive layer 80 and the reflective layer 70 are substantially coextensive with each other in the x-y plane. The at least one light source 12 is disposed in the optical cavity 90. In some embodiments, the at least one light source 12 is a visible light source. The first optically diffusive layer 80 may increase uniformity of the light 13 received from the light source 12. In some embodiments, the light source 12 may include at least one of filament or arc lamps, light emitting diodes (LEDs), linear cold cathode fluorescent tubes, non-linear cold cathode fluorescent tubes, flat fluorescent panels, or external electrode fluorescent lamps.

Figure 2B:
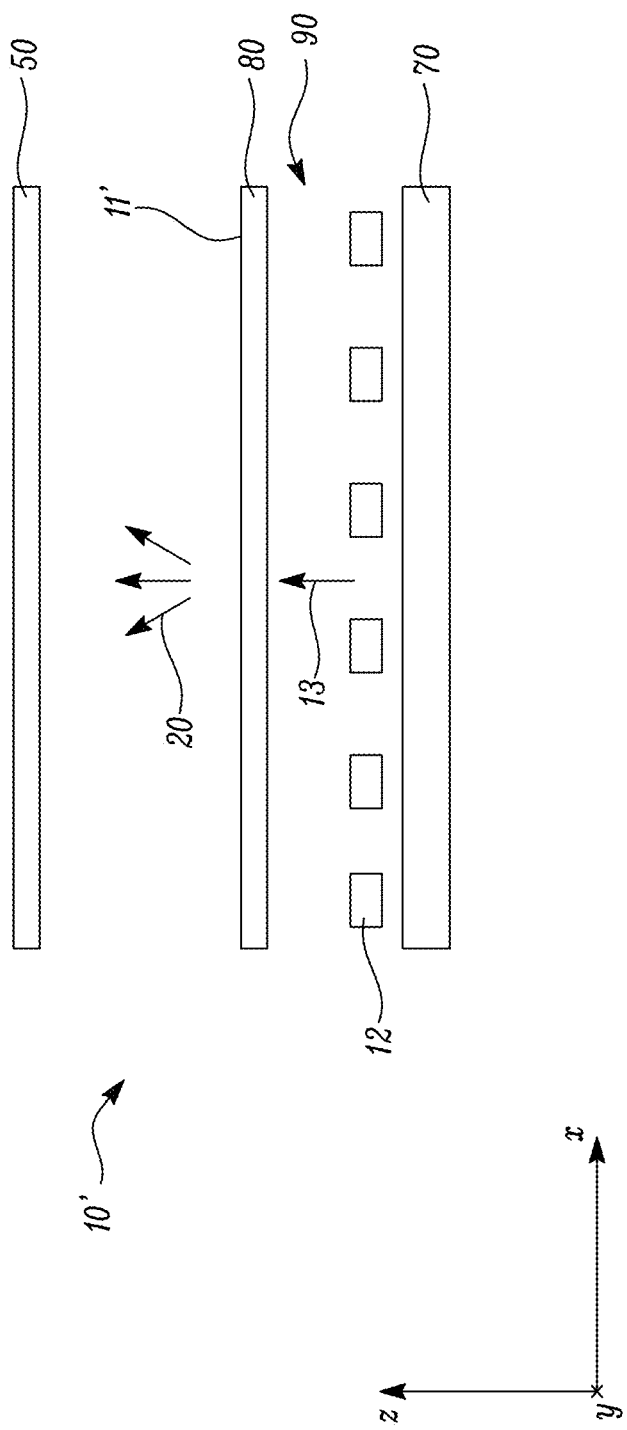
FIG. 2B is a schematic exploded view of the illumination source of FIG. 2A and an optical filter of the optical system of FIG. 1, according to an embodiment of the present disclosure.

FIG. 2B illustrates the extended illumination source 10' and the optical filter 50 disposed on the extended illumination source 10', according to an embodiment of the present disclosure. Specifically, the optical filter 50 is disposed adjacent to the extended emission surface 11' of the extended illumination source 10'. In some embodiments, the optical filter 50 and the extended emission surface 11' are attached by one or more of a pressure sensitive adhesive, an optically clear adhesive, an Ultraviolet (UV) curable adhesive, a polyvinyl alcohol type adhesive, and lamination. In some embodiments, the light source 12 includes an organic light emitting diode (OLED). Therefore, the optical filter 50 and the extended illumination source 10' are disposed in direct optical communication with each other.

Figure 3:
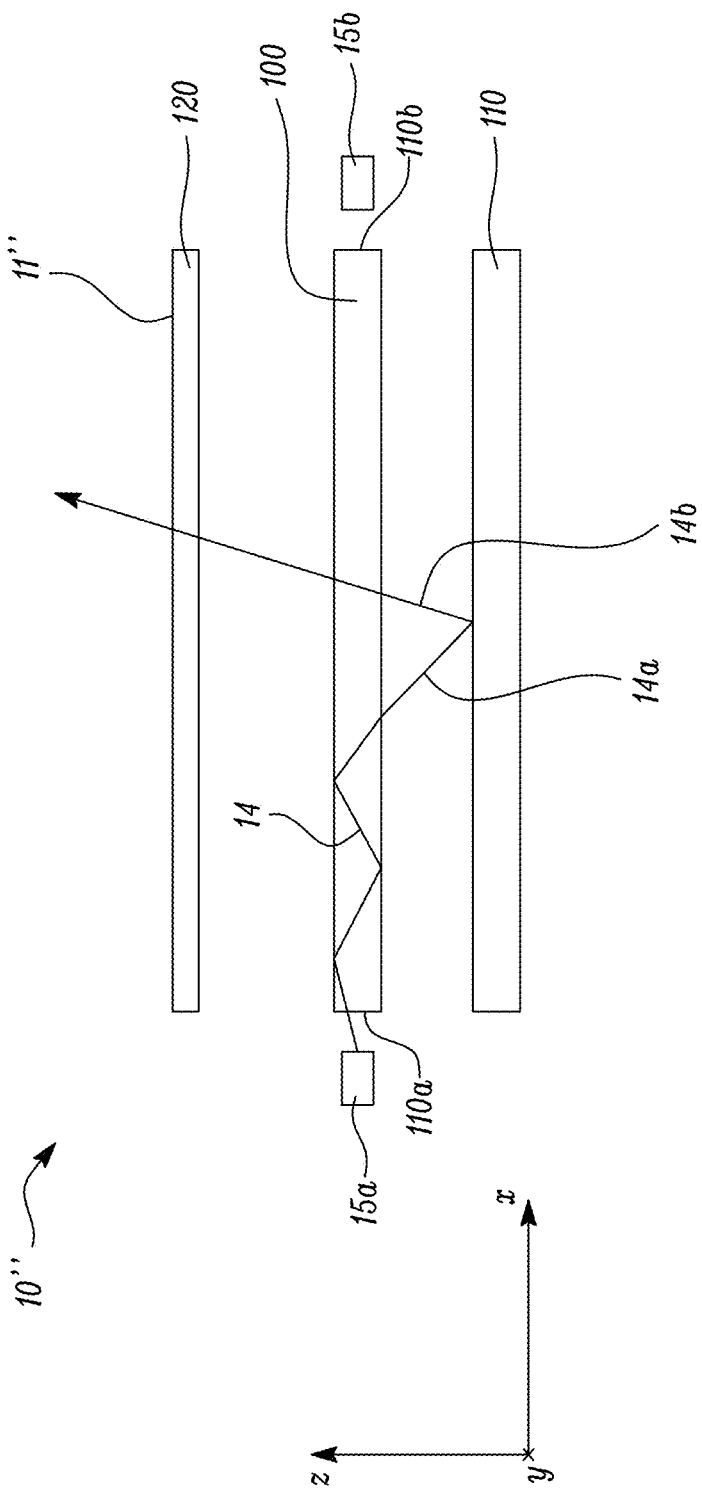
FIG. 3 is a schematic exploded perspective view of an illumination source of the optical system of FIG. 1, according to another embodiment of the present disclosure.

FIG. 3 illustrates an extended illumination source 10" according to another embodiment of the present disclosure. The extended illumination source 10" can be used as the extended illumination source 10 shown in FIG. 1. The extended illumination source 10" includes a lightguide 100 for propagating light 14 therein along a length (i.e., the x-axis) and a width (i.e., the y-axis) of the lightguide 100. The lightguide 100 is disposed between a back reflector 110 and an extended emission surface 11". The extended illumination source 10" further includes at least one light source 15a, 15b disposed proximate an edge surface 110a, 110b of the lightguide 100. In the illustrated embodiment, the light sources 15a, 15b are disposed in an edge-lit configuration proximal to the respective edge surfaces 110a. 110b of the lightguide 100. The back reflector 110 is configured to reflect light 14a that exits the lightguide 100 toward the back reflector 110. Further, the back reflector 110 is configured to reflect the light 14a as a reflected light 14b. The reflected light 14b exits the extended illumination source 10" through the extended emission surface 11" thereof. In some embodiments, the light sources 15a, 15b are visible light sources. In some embodiments, the light sources 15a, 15b may include at least one of filament or arc lamps, light emitting diodes (LEDs), linear cold cathode fluorescent tubes, non-linear cold cathode fluorescent tubes, flat fluorescent panels, or external electrode fluorescent lamps.

With continued reference to FIG. 3, the extended illumination source 10" further includes a second optically diffusive layer 120 disposed on the lightguide 100. The second optically diffusive layer 120 includes the extended emission surface 11". The second optically diffusive layer 120 may increase uniformity of the light 14b received through the lightguide 100.

Figure 4:
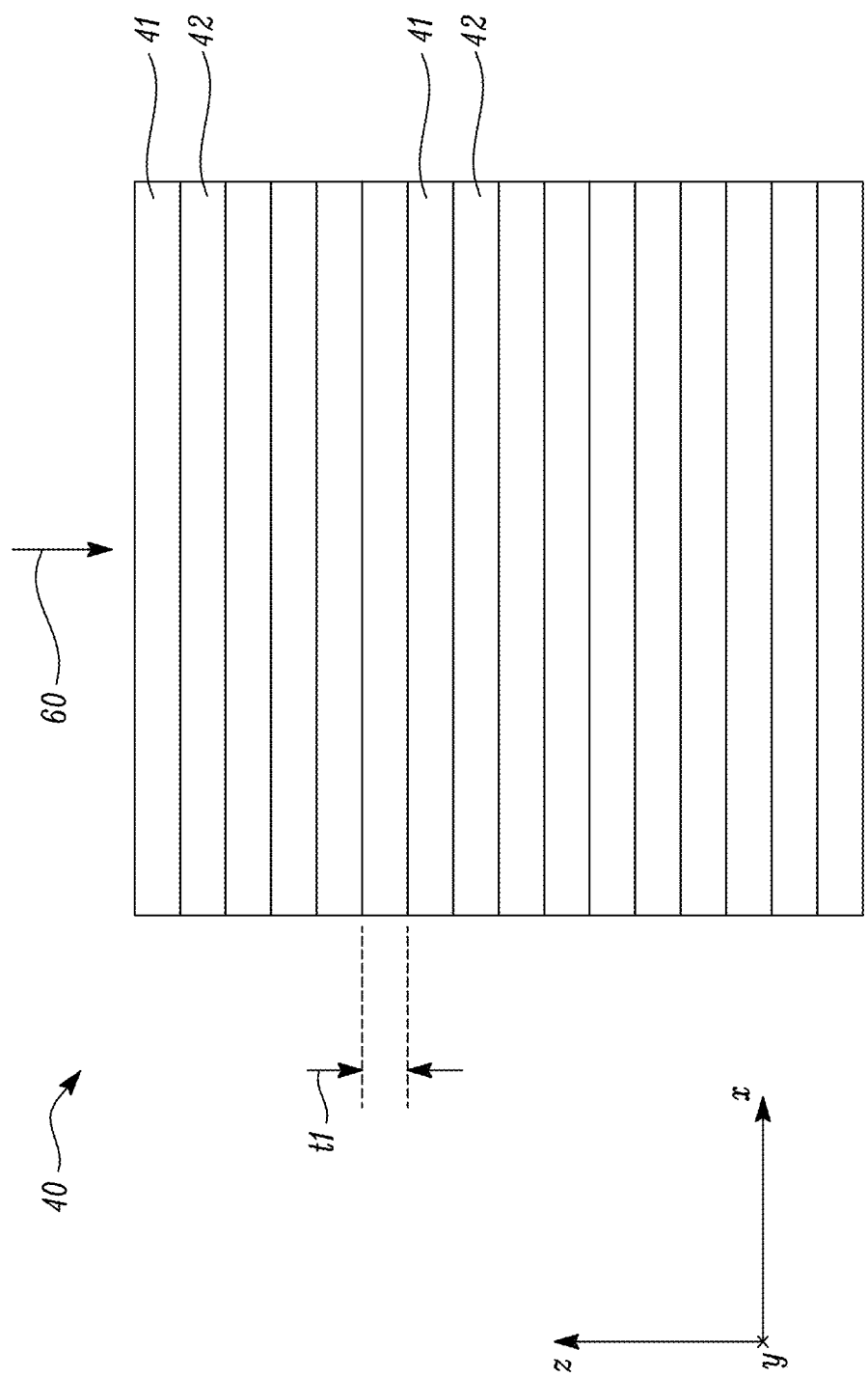
FIG. 4 is a detailed schematic view of a reflective polarizer of the optical system of FIG. 1, according to an embodiment of the present disclosure.

FIG. 4 illustrates a schematic view of the reflective polarizer 40 according to an embodiment of the present disclosure. In some cases, the reflective polarizer 40 may include one or more of a polymeric reflective polarizer, a wire grid reflective polarizer, and a diffuse reflective polarizer. Referring to FIGS. 1 and 4, the reflective polarizer 40 is disposed on the emission surface 11 of the extended illumination source 10, and includes a plurality of first polymeric layers 41, 42 numbering at least 10 in total. Specifically, as shown in FIG. 1, the reflective polarizer 40 is disposed on the emission surface 11 of the extended illumination source 10, and adjacent to the display panel 30. The first polymeric layers 41, 42 are arranged in an alternating manner along a thickness (i.e., the z-axis) of the reflective polarizer 40. In some embodiments, the plurality of first polymeric layers 41, 42 number at least 30, at least 40, at least 50, at least 70, at least 100, at least 200, or at least 300 in total. In some embodiments, each of the first polymeric layers 41 includes a high index optical material (HIO) of polyethylene naphthalate (PEN). In some embodiments, each of the first polymeric layers 41 includes the high index optical material (HIO) of low melt PEN. In some embodiments, each of the first polymeric layers 42 includes a low index optical material (LIO) of CoPET (copolymer of polyethylene terephthalate) or CoPEN or a blend of polycarbonate and CoPET.

Figure 5:
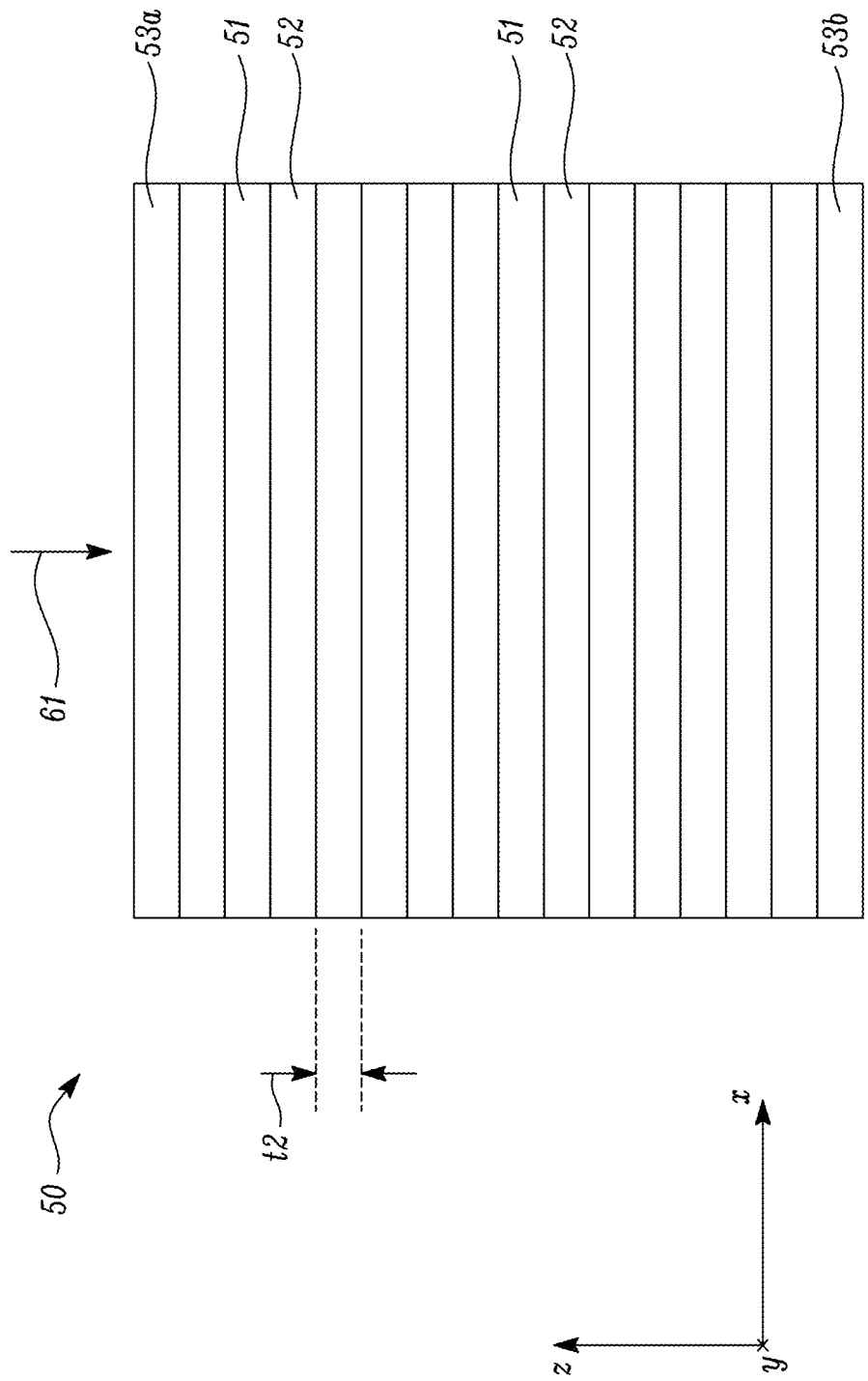
FIG. 5 is a detailed schematic view of the optical filter of the optical system of FIG. 1, according to an embodiment of the present disclosure.

FIG. 5 illustrates a schematic view of the optical filter 50 according to an embodiment of the present disclosure. Referring FIGS. 1 and 5, the optical filter 50 is disposed between the reflective polarizer 40 and the emission surface 11 of the extended illumination source 10, and includes a plurality of second polymeric layers 51, 52 numbering at least 10 in total. As shown in FIG. 1, the optical filter 50 is disposed adjacent to the reflective polarizer 40. The second polymeric layers 51, 52 are arranged in an alternating manner along a thickness (i.e., the z-axis) of the optical filter 50. In some embodiments, the plurality of second polymeric layers 51, 52 number at least 30, at least 40, at least 50, at least 70, at least 100, at least 200, at least 300, or at least 400 in total. The second polymeric layers 51, 52 may include materials including copolymers of polystyrene (PS) and/or poly (methyl methacrylate) (PMMA). In some embodiments, each of the second polymeric layers 51 includes the high index optical layer (HIO) of polyethylene terephthalate (PET) homopolymer (100 mol % terephthalic acid with 100 mol % ethylene glycol) having a glass transition temperature (Tg) from about 81 degrees Celsius (° C.) to about 83° C. In some embodiments, each of the second polymeric layers 52 includes the low index optical layer (LIO) of copolymer of poly (methyl methacrylate) or coPMMA, available, for example, from Plaskolite, Columbus, OH, under the tradename OPTIX and has a Tg of about 80° C.

Further, the second polymeric layers 51, 52 can be interchangeably referred to as the polymeric layers 51, 52.

Referring to FIGS. 4 and 5, each of the first and second polymeric layers 41, 42, 51, 52 has an average thickness "t1", "t2". Specifically, each of the first polymeric layers 41, 42 defines the average thickness "t1" along the z-axis. Further, each of the second polymeric layers 51, 52 defines the average thickness "t2" along the z-axis. The term "average thickness", as used herein, refers to an average thickness along a plane of a layer. In the illustrated embodiments of FIGS. 4 and 5, the average thickness is measured along the x-y plane. In some embodiments, each of the first and second polymeric layers 41, 42, 51, 52 has the average thickness "t1", "t2" of less than about 300 nanometers (nm). In other words, each of the average thicknesses "t1", "t2" may be less than about 300 nm. In some embodiments, each of the first and second polymeric layers 41, 42, 51, 52 may have the average thickness "t1", "t2" of less than about 250 nm, less than about 200 nm, less than about 150 nm, less than about 100 nm, or less than about 80 nm. In some embodiments, each of the average thicknesses "t1", "t2" is at least about 50 nm.

Referring to FIG. 1, the optical system 500 further includes an optical combination 600. In some embodiments, the optical combination 600 is disposed on the emission surface 11 of the extended illumination source 10. Specifically, the optical combination 600 is disposed between the extended illumination source 10 and the display panel 30. The optical combination 600 is disposed adjacent to the display panel 30. The optical combination 600 includes the reflective polarizer 40 and the optical filter 50. The optical filter 50 is disposed in optical communication with the reflective polarizer 40. As already stated above, the optical filter 50 is disposed between the reflective polarizer 40 and the emission surface 11. In some embodiments, the reflective polarizer 40 and the optical filter 50 of the optical combination 600 are attached to each other by one or more of a pressure sensitive adhesive, an optically clear adhesive, an Ultraviolet (UV) curable adhesive, a polyvinyl alcohol type adhesive, and lamination. However, the reflective polarizer 40 and the optical filter 50 may be attached to each other by any suitable attachment methods based on desired application attributes. In the illustrated embodiment of FIG. 1, the reflective polarizer 40 and the optical filter 50 are disposed adjacent to each other. In some embodiments, the reflective polarizer 40 and the optical filter 50 are spaced apart from each other, such that the reflective polarizer 50 and the optical filter 50 are disposed in optical communication with each other. However, it should be noted that the optical filter 50 may be disposed at any position between the reflective polarizer and the emission surface 11 of the extended illumination source 10. In some embodiments, each of the reflective polarizer 40 and the optical filter 50 in the optical combination 600 may be substantially planar and disposed along the x-y plane. Referring to FIGS. 1, 4 and 5, in some embodiments, the reflective polarizer 40 of the optical combination 600 includes the plurality of first polymeric layers 41, 42, and the optical filter 50 of the optical combination 600 includes the plurality of second polymeric layers 51, 52.

Figure 6:
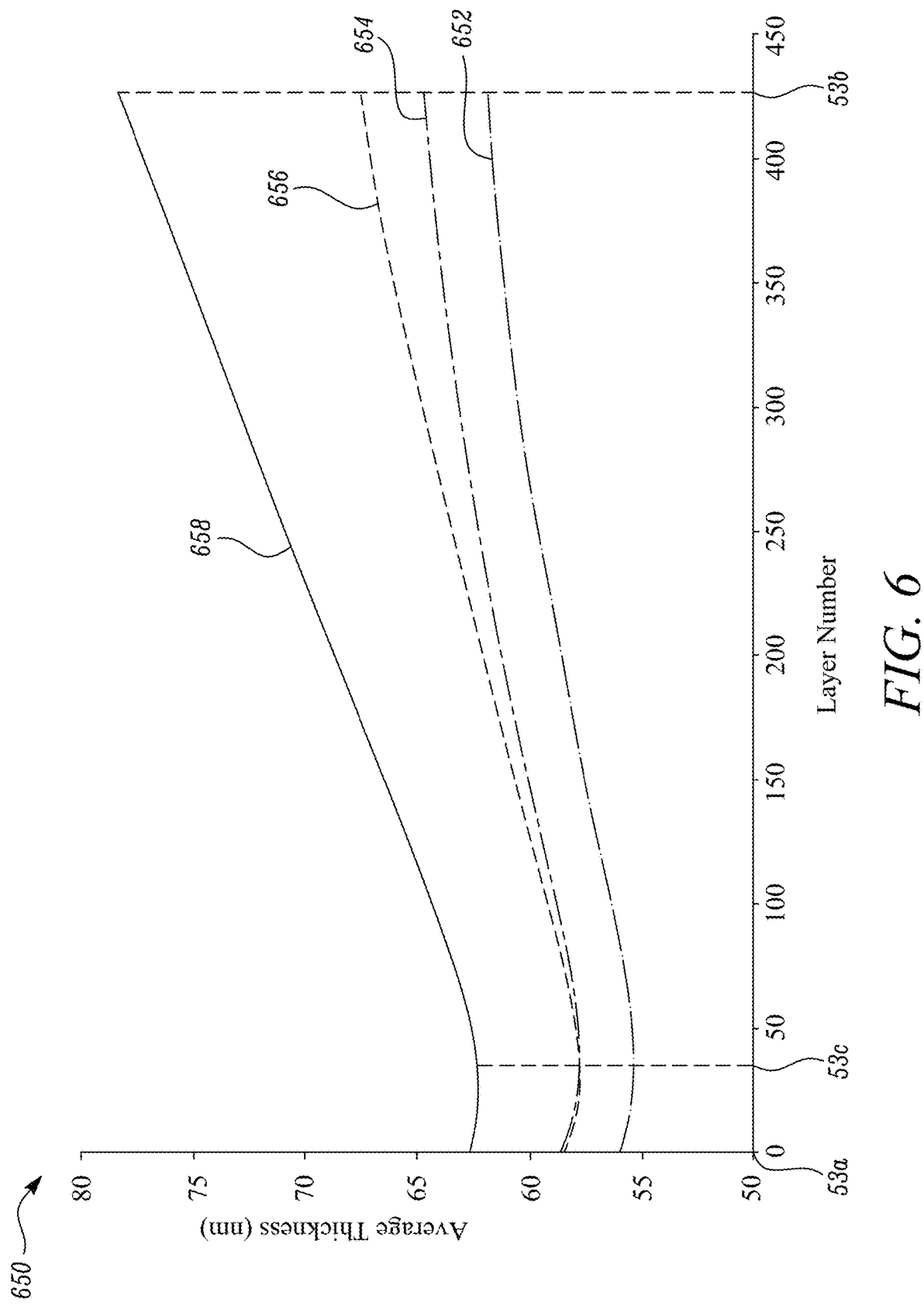
FIG. 6 is a graph illustrating layer number versus average thickness for the optical filter of FIG. 3, according to one embodiment of the present disclosure.

FIG. 6 shows an exemplary graph 650 illustrating variation of thickness with a layer number of the second polymeric layers 51, 52 in the optical filter 50. As described above with reference to FIGS. 1 and 5, the optical filter 50 is disposed in the optical communication with the reflective polarizer 40 and includes the plurality of second polymeric layers 51, 52 numbering at least 10 in total. In the illustrated embodiment of FIG. 5, the plurality of second polymeric layers 51, 52 is disposed between opposing outermost polymeric layers 53a, 53b. Each of the opposing outermost polymeric layers 53a, 53b and each second polymeric layer 51, 52 therebetween has the average thickness "t2" of less than about 300 nm. The opposing outermost polymeric layers 53a, 53b may act as protective layers of the optical filter 50. For example, the opposing outermost polymeric layers 53a, 53b may act as protective boundary layers (PBL) of the optical filter 50.

The graph 650 illustrates plots between the average thickness "t2" of the second polymeric layers 51, 52 and the layer number of the second polymeric layers 51, 52 for different configurations or designs of the optical filter 50. The outermost polymeric layer 53a is designated as layer number 0. The layer number increases sequentially from the outermost polymeric layer 53a to the outermost polymeric layer 53b. The outermost polymeric layer 53b has a highest layer number. Therefore, the second polymeric layers 51, 52 disposed between the opposing outermost layer 53a, 53b have layer numbers greater than 0 and less than the highest layer number corresponding to the outermost polymeric layer 53b.

In some embodiments, a thinnest second polymeric layer 53c in the plurality of second polymeric layers 51, 52 is disposed between and spaced apart from the opposing outermost polymeric layers 53a. 53b. Further, each configuration of the optical filter 50 may have a maximum layer number of about 1000. Further, the thickness "t2" may be from about 50 nm to about 80 nm.

In the illustrated example of FIG. 6, a plot 652 is a plot of the average thickness "t2" versus the layer number of the second polymeric layers 51, 52 for a first design of the optical filter 50. A plot 654 is a plot of the average thickness "t2" versus the layer number of the second polymeric layers 51, 52 for a second design of the optical filter 50. A plot 656 is a plot of the average thickness "t2" versus the layer number of the second polymeric layers 51, 52 for a third design of the optical filter 50. A plot 658 is a plot of the average thickness "t2" versus the layer number of the second polymeric layers 51, 52 for a fourth design of the optical filter 50. In each of the plots 652, 654, 656 and 658, the average thickness "t2" substantially decreases from the outermost polymeric layer 53a to the thinnest second polymeric layer 53c. The average thickness "t2" substantially increases from the thinnest second polymeric layer 53c. A layer number of the thinnest second polymeric layer 53c is greater than 0 and less than the highest layer number. In the illustrated example of FIG. 6, the layer number of the thinnest second polymeric layer 53c is about 35. Therefore, the thinnest second polymeric layer 53c may be proximal to the outermost polymeric layer 53a. However, in some other cases, the thinnest second polymeric layer 53c may be proximal to the outermost polymeric layer 53b. The thinnest second polymeric layer 53c may have a minimum average thickness among the second polymeric layers 51, 52 of the optical filter 50. Further, the minimum average thickness of the thinnest second polymeric layer 53c may correspond to a minima in the corresponding plot of average thickness versus layer number.

The variation of the average thickness "t2" of the second polymeric layers 51, 52 with the layer number may be referred to as a layer thickness gradient of the optical filter 50.

Figure 7:
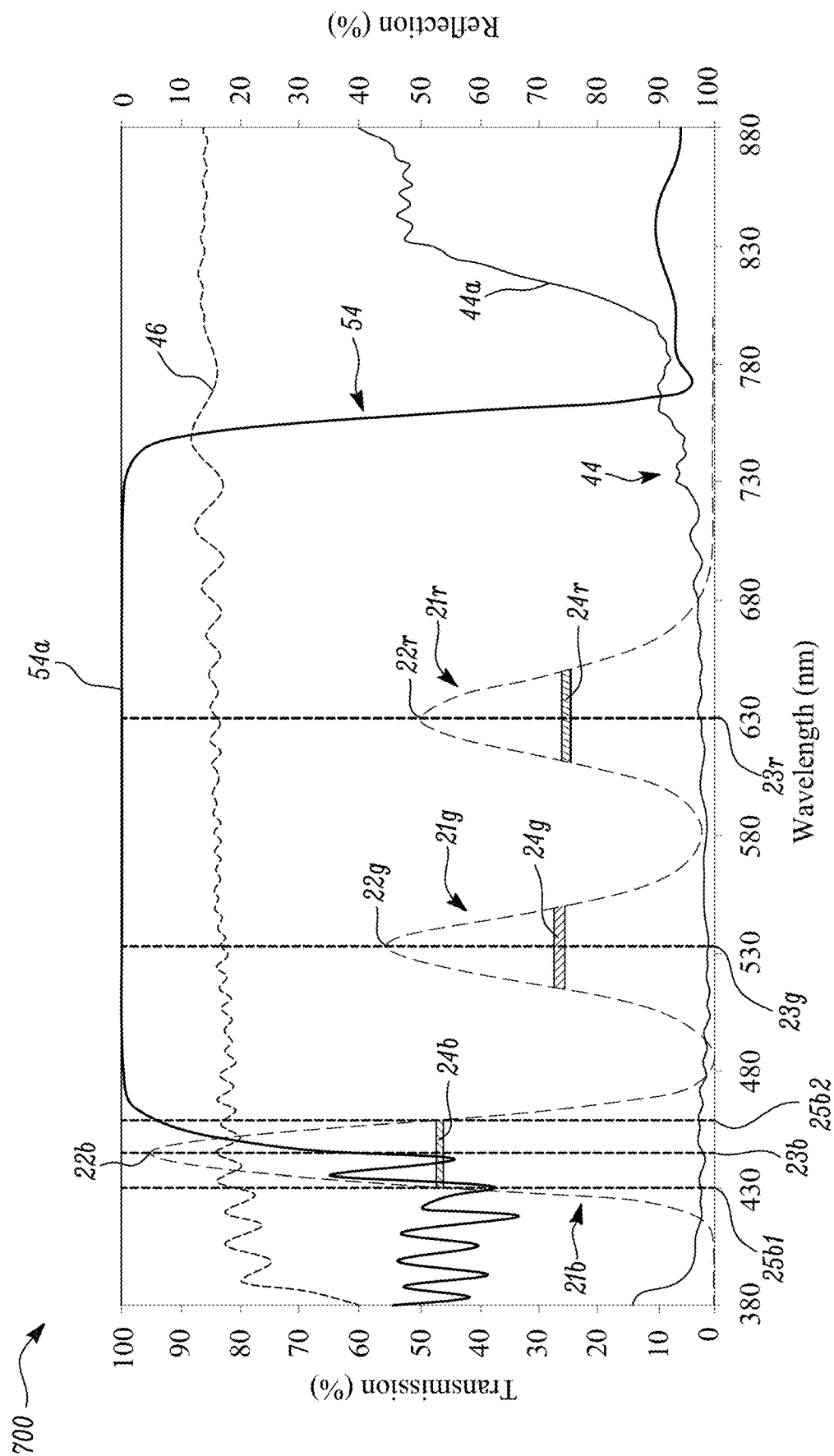
FIG. 7 is a graph illustrating transmission versus wavelength for the reflective polarizer and the optical filter of the optical system, according to one embodiment of the present disclosure.
Figure 8:
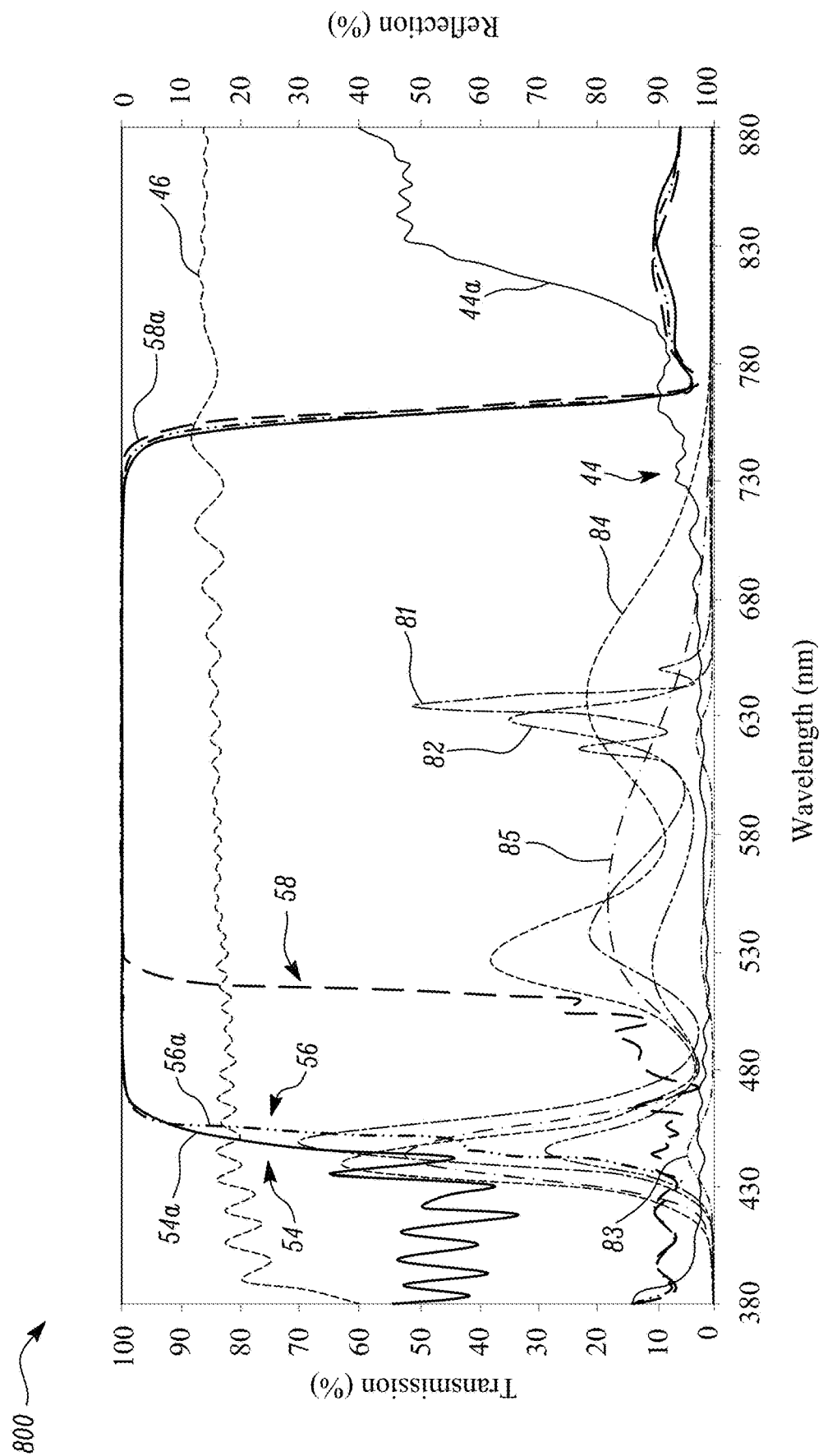
FIG. 8 is another graph illustrating transmission versus wavelength for the reflective polarizer and the optical filter of the optical system, according to another embodiment of the present disclosure.

FIGS. 7 and 8 illustrate exemplary graphs 700, 800, respectively. The graphs 700, 800 depict transmission percentage versus wavelength for different transmission spectra of the reflective polarizer 40 and the optical filter 50 (shown in FIG. 1). Wavelength is expressed in nanometers (nm) in the abscissa. In FIGS. 7 and 8, transmission is expressed as transmission percentage in the left ordinate. Reflection is expressed as reflection percentage in the right ordinate. The reflection percentage is complementary to the transmission percentage, i.e., reflection percentage=(100−transmission percentage).

Referring to FIGS. 1 and 7, in some embodiments, the emitted light 20 includes a blue emission spectrum 21b including a blue peak 22b at a blue peak wavelength 23b and a corresponding blue full width at half maxima (FWHM) 24b. The blue FWHM 24b extends from a smaller blue wavelength 25b1 to a longer blue wavelength 25b2. The emitted light 20 further includes substantially distinct green and red emission spectra 21g, 21r including respective green and red peaks 22g, 22r at respective green and red peak wavelengths 23g, 23r and corresponding green and red FWHMs 24g, 24r. Therefore, the emitted light 20 includes substantially distinct blue, green and red emission spectra 21b, 21g, 21r including respective blue, green and red peaks 22b, 22g, 22r at respective blue, green and red peak wavelengths 23b, 23g. 23r and corresponding blue, green and red FWHMs 24b, 24g, 24r. In the illustrated embodiment of FIG. 7, the substantially distinct blue, green and red emission spectra 21b, 21g, 21r may together form a total emission spectra of the extended illumination source 10. Any suitable energy unit may be used to illustrate the blue, green and red emission spectra 21b, 21g, 21r of the extended illumination source 10 in the graph 700.

As shown in the graph 700, the smaller blue wavelength 25b1 is about 430 nm and the longer blue wavelength 25b2 is about 460 nm. The blue, green and red peak wavelengths 23b, 23g, 23r are about 445 nm, 530 nm, and 630 nm, respectively.

In some embodiments, the first polarization state is a P polarization state, and the second polarization state is a S polarization state. In some other embodiments, the first polarization state is a S polarization state, and the second polarization state is a P polarization state. The first polarization state is generally along the x-axis, while the second polarization state is generally along the y-axis.

Referring to FIGS. 4 and 7, in some embodiments, for a substantially normally incident light 60 and for the first polarization state, the reflective polarizer 40 includes a reflection spectrum 44. The reflective polarizer 40 may be at least partially transmissive in at least a portion of the reflection spectrum 44. Specifically, the reflection spectrum 44 includes a transmission band 44a. A FWHM of the transmission band 44a may extend from a wavelength greater than about 800 nm. In some embodiments, for the substantially normally incident light 60 and for the first polarization state, the reflective polarizer 40 may transmit at least about 40% of the incident light 60 for at least one wavelength greater than about 800 nm. In some embodiments, for the substantially normally incident light 60 and for the first polarization state, the reflective polarizer 40 may have an average transmittance of at least about 40% for each wavelength in an infrared wavelength range from about 800 nm to about 1500 nm. In some embodiments, for the substantially normally incident light 60 and for the orthogonal second polarization state, the reflective polarizer 40 includes a transmission spectrum 46. Therefore, in some embodiments, the reflective polarizer 40 includes the reflection spectrum 44 corresponding to the first polarization state and the transmission spectrum 46 corresponding to the second polarization state.

In some embodiments, for the substantially normally incident light 60 and for each of the blue, green and red peak wavelengths 23b, 23g. 23r, the plurality of first polymeric layers 41, 42 of the reflective polarizer 40 reflects greater than about 60% of the incident light 60 having the first polarization state and transmits greater than about 60% of the incident light 60 having the orthogonal second polarization state. In other words, for the substantially normally incident light 60 and for each of the blue, green and red peak wavelengths 23b, 23g, 23r, the reflective polarizer 40 reflects greater than about 60% of the incident light 60 having the first polarization state and transmits greater than about 60% of the incident light 60 having the orthogonal second polarization state. In some embodiments, for each of the blue, green and red peak wavelengths 23b, 23g, 23r, the plurality of first polymeric layers 41, 42 reflects greater than about 70% of the incident light 60 having the first polarization state and transmits greater than about 70% of the incident light 60 having the orthogonal second polarization state. In some embodiments, for each of the blue, green and red peak wavelengths 23b, 23g, 23r, the plurality of first polymeric layers 41, 42 reflects greater than about 80%, greater than about 90%, greater than about 95%, or greater than about 99% of the incident light 60 having the first polarization state. In some embodiments, for each of the blue, green and red peak wavelengths 23b, 23g, 23r, the plurality of first polymeric layers 41, 42 transmits greater than about 80%, greater than about 85%, or greater than about 90% of the incident light 60 having the orthogonal second polarization state.

In some embodiments, for the substantially normally incident light 60, and for a blue wavelength range extending from about 430 nm to about 480 nm, a green wavelength range extending from about 500 nm to about 570 nm, and a red wavelength range extending from about 600 nm to about 680 nm, and for at least one wavelength in each of the blue, green and red wavelength ranges, the plurality of first polymeric layers 41, 42 reflects greater than about 60% of the incident light 60 having the first polarization state and transmits greater than about 60% of the incident light 60 having the orthogonal second polarization state. In other words, for the substantially normally incident light 60 and for the at least one wavelength in each of the blue, green and red wavelength ranges, the reflective polarizer 40 reflects greater than about 60% of the incident light 60 having the first polarization state and transmits greater than about 60% of the incident light 60 having the orthogonal second polarization state. In some embodiments, for the at least one wavelength in each of the blue, green and red wavelength ranges, the plurality of first polymeric layers 41, 42 reflects greater than about 70% of the incident light 60 having the first polarization state and transmits greater than about 70% of the incident light having the second polarization state. In some embodiments, for the at least one wavelength in each of the blue, green and red wavelength ranges, the plurality of first polymeric layers 41, 42 reflects greater than about 80%, greater than about 90%, greater than about 95%, or greater than about 99% of the incident light 60 having the first polarization state. In some embodiments, for the at least one wavelength in each of the blue, green and red wavelength ranges, the plurality of first polymeric layers 41, 42 transmits greater than about 80%, greater than about 85%, or greater than about 90% of the incident light 60 having the orthogonal second polarization state.

In some embodiments, for the substantially normally incident light 60 and for the blue peak wavelength 23b, the plurality of first polymeric layers 41, 42 reflects greater than about 60% of the incident light 60 having the first polarization state and transmits greater than about 60% of the incident light 60 having the second polarization state. In other words, for the substantially normally incident light 60 and for the blue peak wavelength 23b, the reflective polarizer 40 reflects greater than about 60% of the incident light 60 having the first polarization state and transmits greater than about 60% of the incident light 60 having the second polarization state. In some embodiments, for the substantially normally incident light 60 and for the blue peak wavelength 23b, the plurality of first polymeric layers 41, 42 reflects greater than about 70%, greater than about 80%, greater than about 90%, greater than about 95%, or greater than about 99% of the incident light 60 having the first polarization state. In some embodiments, for the substantially normally incident light 60 and for the blue peak wavelength 23b, the plurality of first polymeric layers 41, 42 transmits greater than about 70%, greater than about 75%, or greater than about 80% of the incident light 60 having the second polarization state.

Referring to FIGS. 5 and 7, for a substantially normally incident light 61 and for each of the first and second polarization states, the optical filter 50 includes a transmission spectrum 54. In some embodiments, the transmission spectrum 54 includes a transmission band 54a. In some embodiments, the transmission band 54a may lie in a wavelength range from about 430 nm to about 750 nm. In some embodiments, for the substantially normally incident light 61 and for each of the first and second polarization states, the optical filter 50 transmits greater than about 50% of the incident light 61 for each wavelength in the transmission band 54a.

In some embodiments, for the substantially normally incident light 61, for each of the green and red peak wavelengths 23g. 23r, and for each of the first and second polarization states, the plurality of second polymeric layers 51, 52 transmits greater than about 70% of the incident light 61. In other words, for the substantially normally incident light 61, for each of the green and red peak wavelengths 23g, 23r, and for each of the first and second polarization states, the optical filter 50 transmits greater than about 70% of the incident light 61. In some embodiments, for the substantially normally incident light 61, for each of the green and red peak wavelengths 23g. 23r, and for each of the first and second polarization states, the plurality of second polymeric layers 51, 52 transmits greater than about 80% of the incident light 61. In some embodiments, for the substantially normally incident light 61, for each of the green and red peak wavelengths 23g, 23r, and for each of the first and second polarization states, the plurality of second polymeric layers 51, 52 transmits greater than about 90%, greater than about 95%, or greater than about 99% of the incident light 61.

In some embodiments, for the substantially normally incident light 61, the green wavelength range extending from about 500 nm to about 570 nm, the red wavelength range extending from about 600 nm to about 680 nm, and for each of the first and second polarization states, the plurality of second polymeric layers 51, 52 transmits greater than about 70% of the incident light 61 for the at least one wavelength in each of the green and red wavelength ranges. In other words, for the substantially normally incident light 61 and for each of the first and second polarization states, the optical filter 50 transmits greater than about 70% of the incident light 61 for the at least one wavelength in each of the green and red wavelength ranges. In some embodiments, for the substantially normally incident light 61 and for each of the first and second polarization states, the plurality of second polymeric layers 51, 52 transmits greater than about 80% of the incident light 61 for the at least one wavelength in each of the green and red wavelength ranges. In some embodiments, for the substantially normally incident light 61 and for each of the first and second polarization states, the plurality of second polymeric layers 51, 52 transmits greater than about 85%, greater than about 90%, greater than about 95%, or greater than about 99% of the incident light 61 for the at least one wavelength in each of the green and red wavelength ranges.

In some embodiments, for the substantially normally incident light 61, for the smaller blue wavelength 25b1, and for each of the first and second polarization states, the plurality of second polymeric layers 51, 52 transmits less than about 60% of the incident light 61. In other words, for the substantially normally incident light 61, for the smaller blue wavelength 25$b$1, and for each of the first and second polarization states, the optical filter 50 transmits less than about 60% of the incident light 61. In some embodiments, for the substantially normally incident light 61, for the smaller blue wavelength 25$b$1, and for each of the first and second polarization states, the plurality of second polymeric layers 51, 52 transmits less than about 55% or less than about 50% of the incident light 61.

In some embodiments, for the substantially normally incident light 61 and for each of the first and second polarization states, the plurality of second polymeric layers 51, 52 transmits less at the smaller blue wavelength 25$b$1 than at the longer blue wavelength 25$b$2 by at least 30%. In other words, for the substantially normally incident light 61 and for each of the first and second polarization states, the optical filter 50 transmits less at the smaller blue wavelength 25$b$1 than at the longer blue wavelength 25$b$2 by at least 30%. In some embodiments, for the substantially normally incident light 61 and for each of the first and second polarization states, the plurality of second polymeric layers 51, 52 transmits less at the smaller blue wavelength 25$b$1 than at the longer blue wavelength 25$b$2 by at least 35% or at least 40%, or at least 50%.

Referring to FIGS. 4, 5 and 7, in some embodiments, for the substantially normally incident light 60, for a UV wavelength range extending from about 410 nm to about 420 nm, and for the second polarization state, the plurality of first polymeric layers 41, 42 have an average transmittance T1. In some embodiments, for the substantially normally incident light 61, for the UV wavelength range extending from about 410 nm to about 420 nm and for the second polarization state, the plurality of second polymeric layers 51, 52 have an average transmittance T2. Thus, for the substantially normally incident light 60, 61, for the UV wavelength range extending from about 410 nm to about 420 nm and for the second polarization state, the pluralities of first and second polymeric layers 41, 42, 51, 52 have respective average transmittances T1 and T2, such that T1/T2≥1.5. In other words, a ratio of the average transmittance T1 to the average transmittance T2 is greater than or equal to 1.5. In some embodiments, the average transmittance T2 of the optical filter 50 is less than about 50%.

In some embodiments, T1/T2≥1.7. In some embodiments, T1/T2≥1.9. In some embodiments, T1/T2≥2.

In some embodiments, for the substantially normally incident light 61, for each wavelength in the UV wavelength range, and for each of the first and second polarization states, the optical filter 50 transmits less than about 60% or less than about 55% of the incident light 61.

In some embodiments, for the substantially normally incident light 61 and for each of the first and second polarization states, the plurality of second polymeric layers 51, 52 transmits greater than about 30% of the incident light 61 for the at least one wavelength in the blue wavelength range. As described above, the blue wavelength range extends from about 430 nm to about 480 nm. In some embodiments, for the substantially normally incident light 61 and for each of the first and second polarization states, the plurality of second polymeric layers 51, 52 transmits greater than about 35% of the incident light 61 for the at least one wavelength in the blue wavelength range.

FIG. 8 illustrates transmission spectra 56, 58 including respective transmission bands 56$a$, 58$a$. Referring to FIGS. 4, 5 and 8, in some embodiments, for the substantially normally incident light 61 and for each of the first and second polarization states, the optical filter 50 includes any one of the transmission spectra 54, 56, 58.

The transmission spectra 54, 56, 58 may correspond to different configurations of the optical filter 50. The different configurations of the optical filter 50 may be obtained by varying various parameters of the optical filter 50, for example, but not limited to, the average thickness t2, the layer count, the layer thickness gradient, and materials of the second polymeric layers 51, 52 of the optical filter 50. The optical filter 50 may be chosen based on desired application attributes.

In some embodiments, the light 20 from the extended illumination source 10 (shown in FIG. 1) includes any one of emission spectra 81, 82, 83, 84, 85. Any suitable energy unit may be used to illustrate the emission spectra 81, 82, 83, 84, 85 in the graph 800. The blue, green and red emission spectra 21$b$, 21$g$, 21$r$ (shown in FIG. 7) and the emission spectra 81, 82, 83, 84, 85 correspond to different configurations of the extended illumination source 10. The different configurations of the extended illumination source 10 may correspond to different applications.

Considering the transmission spectra 56 and 58, in some embodiments, for the substantially normally incident light 61, for each wavelength within the UV wavelength range extending from about 410 nm to about 420 nm, and for each of the first and second polarization states, the plurality of second polymeric layers 51, 52 transmits less than about 30% of the incident light 61. In some embodiments, for the substantially normally incident light 61, for each wavelength in the UV wavelength range, and for each of the first and second polarization states, the plurality of second polymeric layers 51, 52 transmits less than about 25%, less than about 20%, or less than about 15% of the incident light 61.

Considering the transmission spectrum 58, in some embodiments, for the substantially normally incident light 61, for each wavelength within the blue wavelength range extending from about 430 nm to about 480 nm, and for each of the first and second polarization states, the plurality of second polymeric layers 51, 52 transmits less than about 50% of the incident light 61. In some embodiments, for the substantially normally incident light 61, for each wavelength in the blue wavelength range, and for each of the first and second polarization states, the plurality of second polymeric layers 51, 52 transmits less than about 40%, less than about 30%, or less than about 20% of the incident light 61.

Considering the transmission spectra 56, 58, in some embodiments, for the substantially normally incident light 61, for each wavelength in each of the green and red wavelength ranges, and for each of the first and second polarization states, the plurality of second polymeric layers 51, 52 transmits greater than about 80% of the incident light 61. As described above, the green wavelength range extends from about 500 nm to about 560 nm. Further, the red wavelength range extends from about 620 nm to about 740 nm. In some embodiments, for the substantially normally incident light 61, for each wavelength in each of the green and red wavelength ranges, and for each of the first and second polarization states, the plurality of second polymeric layers 51, 52 transmits greater than about 80%, greater than about 90%, greater than about 95%, or greater than about 99% of the incident light 61.

Figure 9:
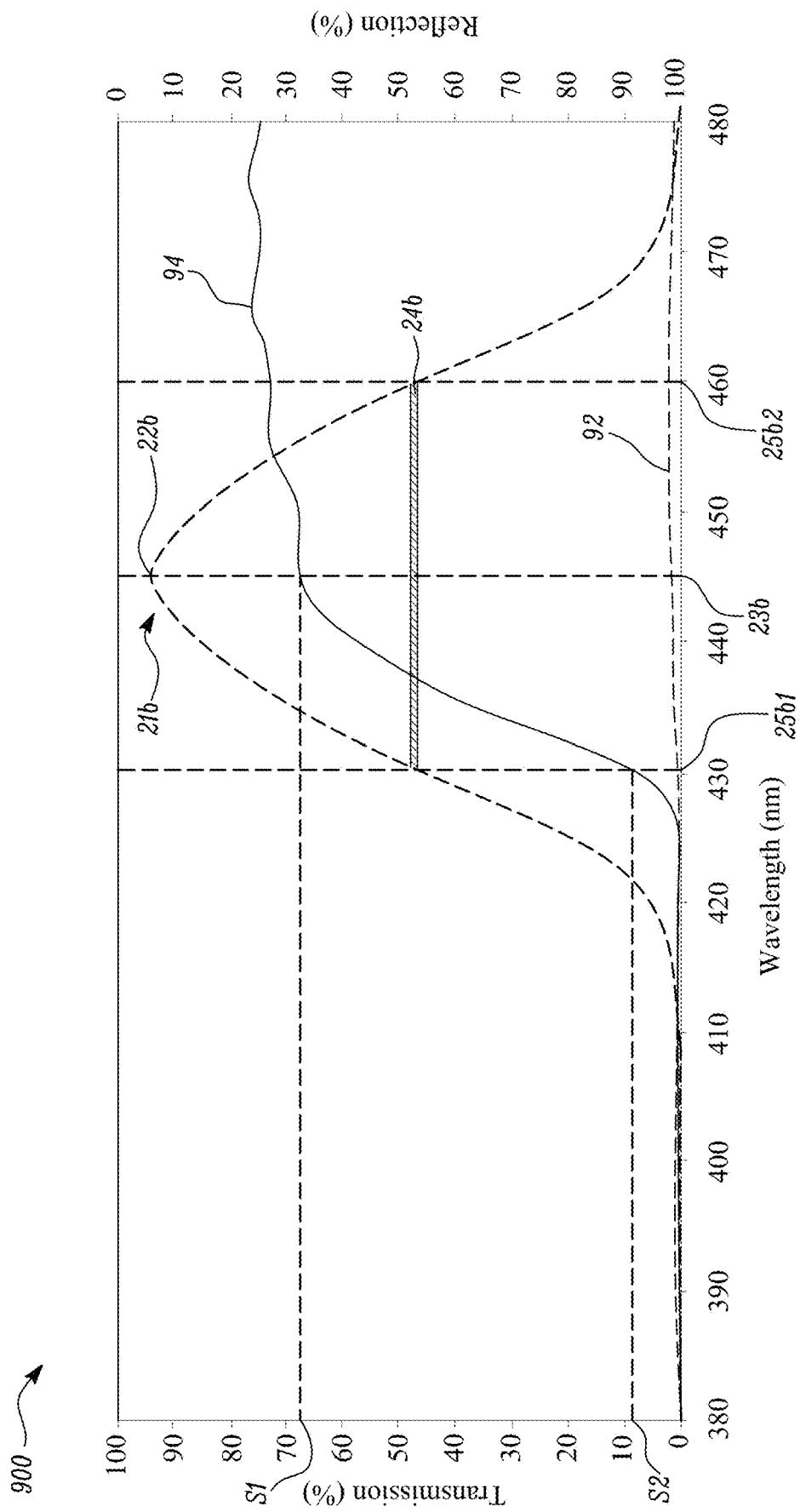
FIG. 9 is a graph illustrating transmission versus wavelength for an optical combination of the optical system of FIG. 1, according to one embodiment of the present disclosure.

FIG. 9 illustrates a graph 900 depicting transmission percentage versus wavelength for the optical combination 600 of the optical system 500. Wavelength is expressed in nanometers (nm) in the abscissa. In FIG. 9, transmission is expressed as transmission percentage in the left ordinate. Reflection is expressed as reflection percentage in the right ordinate. The reflection percentage is complementary to the transmission percentage, i.e., reflection percentage=(100−transmission percentage).

Referring to FIGS. 4, 5 and 9, for the optical combination 600, various optical properties may be expressed in terms of the substantially normally incident light 60 and/or the substantially normally incident light 61. In some embodiments, for the substantially normally incident light 60, 61 and for the first polarization state, the optical combination 600 includes a reflection spectrum 92. In some embodiments, for the substantially normally incident light 60, 61 and for the second polarization state, the optical combination 600 includes a transmission spectrum 94.

In some embodiments, for the substantially normally incident light 60, 61 and for the blue peak wavelength 23b, the optical combination 600 reflects greater than about 70% of the incident light 60, 61 having the first polarization state and has a transmittance S1 greater than about 30% for the orthogonal second polarization state. In some embodiments, for the substantially normally incident light 60, 61 and for the blue peak wavelength 23b, the optical combination 600 reflects greater than about 80%, greater than about 90%, greater than about 95%, or greater than about 99% of the incident light 60, 61 having the first polarization state. In some embodiments, for the substantially normally incident light 60, 61 and for the blue peak wavelength 23b, the optical combination 600 transmits greater than about 40%, greater than about 50%, or greater than about 60% of the incident light 60, 61 having the second polarization state. In other words, the transmittance S1 may be greater than about 30%, greater than about 40%, greater than about 50%, or greater than about 60%.

In some embodiments, for the substantially normally incident light 60, 61 and for the smaller blue wavelength 25b1, the optical combination 600 reflects greater than about 70% of the incident light 60, 61 having the first polarization state and has a transmittance S2 for the second polarization state, such that S2 is less than S1 by at least 10%. In some embodiments, for the substantially normally incident light 60, 61 and for the smaller blue wavelength 25b1, the optical combination 600 reflects greater than about 80%, greater than about 90%, greater than about 95%, or greater than about 99% of the incident light 60, 61 having the first polarization state. In some embodiments, for the substantially normally incident light 60, 61 and for the smaller blue wavelength 25b1, the optical combination 600 transmits less than about 70%, less than about 60%, less than about 50%, less than about 40%, less than about 30%, or less than about 20% of the incident light 60, 61 having the second polarization state. In other words, the transmittance S2 may be less than about 70%, less than about 60%, less than about 50%, less than about 40%, less than about 30%, or less than about 20%. In some embodiments, the transmittance S2 is less than the transmittance S1 by at least 15%. In some embodiments, S2 is less than S1 by at least 20%, at least 30%, at least 35%, at least 40%, at least 50%, or at least 60%.

Referring to FIGS. 1, 4, 5, 7 and 9, in some embodiments, for the substantially normally incident light 61, for the smaller blue wavelength 25b1, and for each of the first and second polarization states, the optical filter 50 transmits less than about 60% of the incident light 61. In some embodiments, for the substantially normally incident light 60 and for each wavelength in the blue wavelength range extending from about 430 nm to about 480 nm, the reflective polarizer 40 reflects greater than about 60% of the incident light 60 having the first polarization state. Therefore, for the smaller blue wavelength 25b1 and for each of the first and second polarization states, the optical combination 600 including the optical filter 50 and the reflective polarizer 40 may reflect a substantial portion of normally incident light. Consequently, the optical system 500 including the optical combination 600 may have an overall high reflectance for the smaller blue wavelength 25b1. The high reflectance for the smaller blue wavelength 25b1 may safeguard a viewer from harmful effects (e.g., macular degeneration) of smaller blue wavelength light rays.

The optical filter 50 may also have low transmittance in the UV wavelength range relative to the reflective polarizer 40. The optical combination 600 may therefore have an overall low transmittance in the UV wavelength range.

In some embodiments, for the substantially normally incident light 61, for each of the green and red peak wavelengths 22g, 22r, and for each of the first and second polarization states, the optical filter 50 transmits greater than about 70% of the incident light 61. In some embodiments, for the substantially normally incident light 60 and for the at least one wavelength in each of the green and red wavelength ranges, the reflective polarizer 40 transmits greater than about 60% of the incident light 60 having the orthogonal second polarization state. Therefore, the optical system 500 may have an overall high transmission in a visible wavelength range other than smaller blue wavelengths. Therefore, the optical system 500 may not generate an undesirable color shift. Further, the optical system 500 may have high efficiency.

In some embodiments, for the substantially normally incident light 60, 61 and for the blue peak wavelength 23b, the optical combination 600 reflects greater than about 70% of the incident light 60, 61 having the first polarization state, and transmits greater than about 30% of the incident light 60, 61 having the second polarization state. In some embodiments, for the substantially normally incident light 60, 61 and for the smaller blue wavelength 25b1, the optical combination 600 reflects greater than about 70% of the incident light 60, 61 having the first polarization state, and transmits less than about 60% of the incident light 60, 61 having the second polarization state. Thus, for the second polarization state, the optical combination 600 may provide a transition from substantially reflecting or blocking the incident light 60, 61 (e.g., transmittance <10% at 420 nm) to substantially transmitting the incident light 60, 61 (e.g., transmittance >50% at 440 nm) within a relatively narrow wavelength range of about 15 nm to about 20 nm. For the second polarization state, the optical combination 600 may therefore provide a strong transmission band with a sharp band edge required to obtain a color balanced white transmission, while blocking smaller blue wavelengths. The reflective polarizer 40 and the optical filter 50 may enable the optical system 500 to substantially block low wavelength blue light in a narrow band. Hence, the combination of the reflective polarizer 40 and the optical filter 50 of the present disclosure may exhibit an improved performance in reducing the transmission of smaller blue wavelengths in the visible spectrum, while providing minimal color shift.

Unless otherwise indicated, all numbers expressing feature sizes, amounts, and physical properties used in the specification and claims are to be understood as being modified by the term "about". Accordingly, unless indicated to the contrary, the numerical parameters set forth in the foregoing specification and attached claims are approximations that can vary depending upon the desired properties sought to be obtained by those skilled in the art utilizing the teachings disclosed herein.

Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

The invention claimed is:

1. An optical combination comprising an optical filter in optical communication with a reflective polarizer, such that for a substantially normally incident light, a UV wavelength range extending from about 410 nm to about 420 nm, a blue wavelength range extending from about 430 nm to about 480 nm, a green wavelength range extending from about 500 nm to about 570 nm, and a red wavelength range extending from about 600 nm to about 680 nm:

for at least one wavelength in each of the blue, green and red wavelength ranges, the reflective polarizer reflects greater than about 60% of the incident light having a first polarization state and transmits greater than about 60% of the incident light having an orthogonal second polarization state;

for each of the first and second polarization states, the optical filter transmits greater than about 70% of the incident light for the at least one wavelength in each of the green and red wavelength ranges; and for the second polarization state, the reflective polarizer and the optical filter have respective average transmittances T1 and T2 for the UV wavelength range, $T1/T2 \geq 1.5$.

2. The optical combination of claim 1, wherein the reflective polarizer comprises a plurality of first polymeric layers numbering at least 10 in total, each of the first polymeric layers having an average thickness of less than about 300 nm.

3. The optical combination of claim 1, wherein the optical filter comprises a plurality of second polymeric layers numbering at least 10 in total, each of the second polymeric layers having an average thickness of less than about 300 nm.

* * * * *